April 13, 1937. G. D. ARNOLD 2,076,873
DEHYDRATING APPARATUS
Filed Sept. 9, 1935
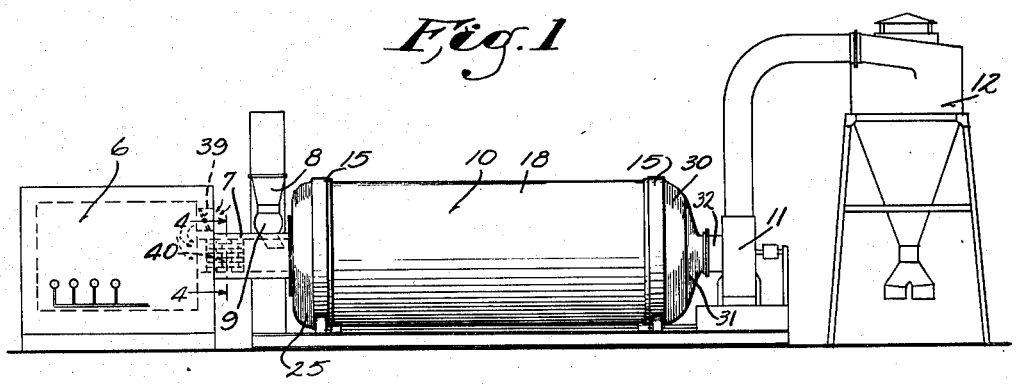
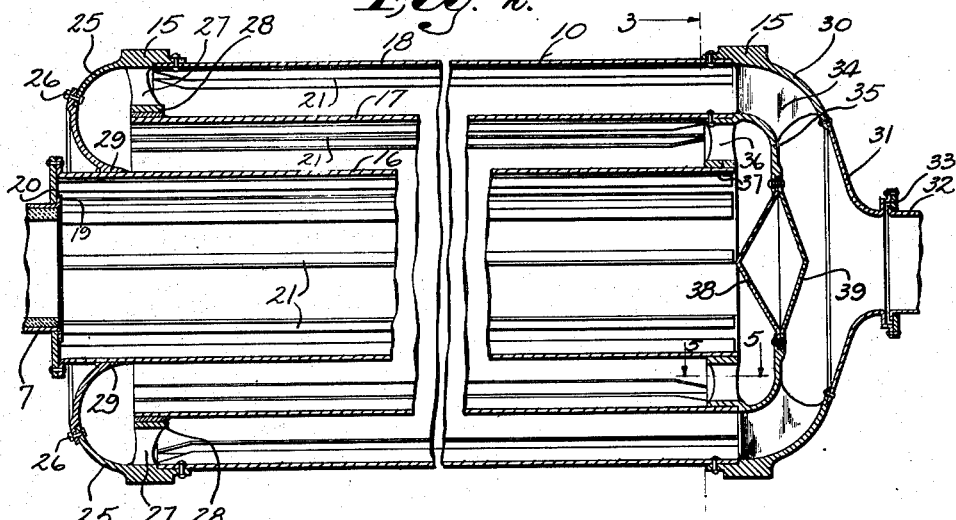
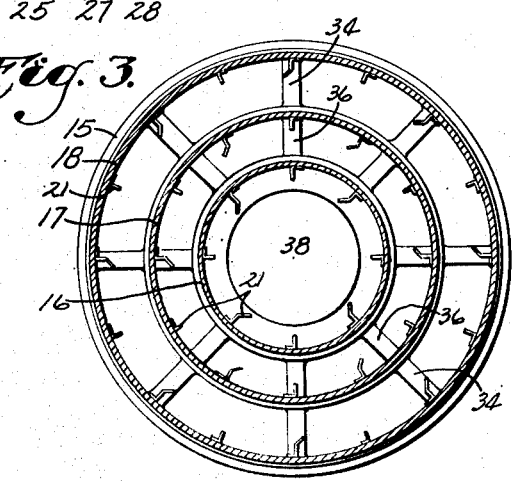
INVENTOR
Gerald D. Arnold
BY Wheeler, Wheeler and Wheeler
ATTORNEYS Patented Apr. 13, 1937

2,076,873

UNITED STATES PATENT OFFICE 2,076,873

DEHYDRATING APPARATUS

Gerald D. Arnold, Wauwatosa, Wis.

Application September 9, 1935, Serial No. 39,776

12 Claims. (Cl. 34—5)

This invention relates to improvements in dehydrating apparatus and more specifically to improvements in apparatus of the type illustrated in my Patent Number 1,988,677.

It is the object of the invention to provide a greatly increased capacity and a more uniformly high quality dehydrated product.

In the use of the apparatus of my former patent above referred to the product was found to be quite generally of high quality, but despite the utmost care in feeding and regulating the machine it was found that from time to time there would be irregular discharges from the machine of an excessively dehydrated and sometimes scorched product. While the amount of this excessively dehydrated product was small, it was sufficient to mar an otherwise perfect output, and the investigation of numerous suggestions as to the possible cause proved to be fruitless. To minimize the amount of scorching the furnace was operated at moderate heat and cool air was admitted to the gases, particularly when partially dried material was being operated upon.

I finally located the trouble in the conformation of the heads and gusset plates of the dehydrating drum, and it is the specific object of the present invention to provide a dehydrating drum comprising concentric shells successively supported by gusset plates, the heads of the drum and the respective shells being so formed as to eliminate dead air pockets in which material can be accumulated, and the gusset plates being so formed and located as to eliminate the probability of material accumulating thereon.

Thereby I have accelerated the flow of all material through the device and consequently have been able to close materially the cold air inlet and increase the heat to obtain an enormously greater output.

It is a further specific object of the invention to eliminate the whirling rotation of material passing through the dehydrating drum by erecting a baffle wall in the throat through which the drum is fed.

By the changes in construction herein disclosed, I have completely eliminated the excessively dehydrated product and now have a completely uniformly high quality output.

In the drawing:

Fig. 1 is a side elevation of my dehydrating equipment incorporating the present invention.

Fig. 2 is an enlarged detail view in section through the dehydrating drum, the intermediate portion thereof being broken away.

Fig. 3 is a detail view taken in section on the line 3—3 of Fig. 2.

Fig. 4 is a detail view in section on the line 4—4 of Fig. 1.

Fig. 5 is a detail view in section on the line 5—5 of Fig. 2.

Like parts are designated by the same reference characters throughout the several views.

As explained in my Patent Number 1,988,677 and Number 1,988,678, I practice dehydration with apparatus which includes a furnace 6 from which hot gases are fed into the dehydrating drum through a pipe 7. The material to be dehydrated is introduced into the pipe through a hopper 8 and rotary valve chamber 9. The drum itself is generically designated by reference character 10. Its outlet end is connected to a large blower fan 11 which receives all of the gases and dehydrated material from the drum and delivers them to a centrifugal separator 12 from the top of which the gases escape and from the bottom of which the dehydrated material is discharged.

The dehydrating drum 10 is mounted for rotation on the supporting rings 15 and comprises a series of concentric shells 16, 17 and 18. The delivery pipe 7 communicates with the inner shell 16 of the drum and has a packed joint therewith by reason of the flange 19 on the inner end of the pipe and a flexible packing ring 20 carried by the end of the inner shell 16. The green or wet material fed into the drum with the stream of gases passing through pipe 7 is too heavy initially to be supported by the stream of gases, and accordingly it falls to the bottom of the rotating inner shell 16. Each of the several shells is provided with longitudinally extending angle irons at 21 which function as buckets to elevate such material until, in the continued rotation of the drum, the material is dropped across the stream of gases to be exposed thereto not only for further dehydration, but for a slight advance pneumatically in the direction of gas flow.

As the material becomes progressively dried, it will be advanced farther and farther upon each successive traverse of the gas stream until, by the time it reaches the end of the inner tube or shell 16, it will be almost capable of being pneumatically transported by the gases at the velocity at which they move through the inner shell. At this point, however, the gas and material pass above the end of the inner shell to be spaced between the inner shell 16 and the intermediate tube or shell 17. Here, because of the increased cross section the velocity of the gases is very much diminished and again the material is incapable of being transported and falls to the bottom where it is picked up and elevated by the buckets 21 in the rotation of the drum. Again, the continued dehydration of material so lightens it so that the velocity of transportation increases and it is finally moved a considerable distance in each traverse of the gas stream. It then passes about the end of the intermediate shell 17 into the outer shell where the flow of gas is again retarded by enlargement in cross section. By the time the material has been pneumatically conveyed to the discharge end of the outer shell 18, its dehydration will be completed to the desired point and it will be discharged from the dehydrator through the fan 11 into the separator.

I have found that where excessive dehydration and scorching of material occurs in apparatus of this character, it is due to the fact that the machine in some manner holds small portions of the material to prevent their progress through the machine in the manner specified. Such holding may be attributable either to the gusset plates which support the inner tubes or shells from the rings 15 and from each other, or to a construction which produces eddy currents or dead air pockets somewhere within the drum. By the construction herein disclosed, I have eliminated both of these sources of trouble.

The ring 15 at the inlet end of the drum comprises a part of a cast drum head 25 which may conveniently be made up in two pieces fastened together by rivets or bolts 26 as shown. Together they comprise an annulus which in any cross section is semi-tubular, the interior surface of the annulus being so rounded as to define a gas passage affording communication between the interiors of the intermediate and outer drums 17 and 18, respectively. The construction is preferably such that there are no corners in which eddy currents may occur, and the cross section at any point on the annulus represents an arc drawn about the end of the intermediate drum 17.

Preferably integral with the outer section of the annular casting 25 are the radial gussets or spacers 27 which, like the spokes of a wheel, carry from the outer ring 15 an inner hub or ring 28 which supports the end of the intermediate shell 17.

Preferably integral with the inner periphery of the annulus 25 is another ring or hub 29 which supports the inner tube or shell 16 at its inlet end.

At the discharge end of the drum the supporting ring 15 is preferably integral with an annular head member 30 having an inner surface of the outer shell 18 in an arc extending almost ninety degrees toward the axis of the drum. The annulus 30 carries in rigid connection with it a head member 31 which may conveniently be made of sheet metal, like the various shells of the drum, and has a packed rotative joint connection with the flanged end of the eye 32 of the centrifugal fan 11. The drum head has flexible packing at 33 engaging over the said flange.

Supported from the outer drum head annulus 30, preferably by integral gussets 34, is an inner annular drum head member 35 of similar conformation, its inner surface having an arcuate form in cross section of approximately ninety degrees. This inner drum head member serves as a head for the intermediate shell 17 and also cooperates with the outer drum head member 30 to provide a discharge passage in which there is an approximately uniform clearance or space. From the inner annular drum head 35 the gussets 36, preferably integral therewith, support a ring or hub 37 which carries the discharge end of the inner tube or shell 16.

I prefer to close the opening in the annulus 35 by means of two sheet metal heads 38 and 39, each of which is preferably of conical form, their apices being oppositely directed for the proper guidance of the material and the elimination of dead air spaces.

The ends of the angle iron buckets or flanges 21 are preferably modified to prevent accumulations thereon. Either they are made to abut some other member (as packing 20 in the case of the inner drum 16) whereby they are not exposed, or else the ends facing the flow are bevelled off as is shown at opposite ends of drums 17 and 18.

The cross section taken through the gusset or spoke 36 which appears in Fig. 5 is typical of all of the gussets 27, 34 and 36. Each is preferably of stream line form with its major axis parallel to the path of gas flow through the apparatus. In each the forward edge is preferably not merely rounded, but of sufficient thickness so that the average length of the stringy material to be dehydrated cannot fold itself over the edge of the gusset to be hung thereon. It is further to be noted that the gussets 36 and 27, which are disposed at the admission ends of the spaces spanned thereby, are in each case, substantially confined to a position of radial, rather than axial projection from the ends of the supported shells or tubes. I have found that if these gussets are projected into the cavities in the drum heads, they tend to accumulate material on their sides instead of promoting the free flow of material past such sides.

As above noted, the major axis of each gusset is preferably parallel to the direction of gas flow at the point where the gusset is located. In the preferred type of furnace shown at 6 the gases are given a helical movement and diluted by the controlled admission of cooling air through the valved inlet at 39. This movement may be continued through the flow of the gases through the dehydrating drum. In order to avoid setting the gussets at an angle with a pitch like that of a propeller blade, I prefer therefore to straighten out the gas flow by the provision of a baffle wall at 40 in the feed pipe 7. This wall may be made of fire brick set vertically in the pipe as shown in Fig. 4, between the furnace and the point of discharge of the hopper 8 into such pipe.

A relatively short baffle wall is effective to direct the gas flow upon an axial rather than a helical path and it not only prevents accumulations of material on the sides of the axially aligned gusset members, but it also makes the drum function more desirably in the intended manner as above outlined, the reason being that the material is pneumatically conveyed axially rather than helically through the several shells of the drum and it is therefore more readily possible to predetermine the effect of the particular temperatures and rates of air flow employed.

It will be apparent from the foregoing description that I have provided a dehydrator in which the flow of gases is straightened out and rendered uniform without eddy currents or angles in which the material to be dehydrated can be trapped and excessively dried. It will likewise be apparent that the design and arrangement of the gussets or supports for the inner shells are such as to eliminate almost entirely the catching of material thereon. As above indicated, the use of a dehydrating drum improved in the above manner produces a substantially completely uniform high grade product, none of which is unduly dehydrated or scorched. And by ensuring the more uniform and continuous progress of the material I am enabled to partially close the air port 39, decreasing the velocity of air flow, increasing the temperature of gases within the dryer and thereby obtain an enormously increased output of dehydrated material with increased efficiency of dehydration.

I claim:

1. In a dehydrator of the character described, the combination with a series of mutually spaced and substantially concentric shells, of gusset means supporting one shell from another and spanning the space therebetween, and means for establishing a pneumatic current for propelling dehydrated material of a stringy nature past said gusset means, said gusset means having its leading margin sufficiently broad and convex to prevent the accumulation thereon of such material, and means for delivering such material into the current aforesaid.

2. In a dehydrator, the combination with shells substantially concentric and in mutually spaced relation, of gusset means for the support of one shell from another, said gusset means being disposed across the space between said shells and having its leading margin sufficiently broad and convex so that stringy material will be prevented from folding thereover, and means for pneumatically propelling material past said gusset means between said shells in a direction toward said leading edge.

3. In a dehydrator, the combination with a series of substantially concentric and mutually spaced shells and means for establishing a flow of gases therebetween and means for feeding to said gases stringy material to be dehydrated thereby for pneumatic propulsion between said shells by said gases, of supports extending in a generally radial direction between said shells and across the space in which pneumatic propulsion of such material occurs, said supports having leading margins sufficiently broad and convex to prevent said material from folding thereover, and each said support being elongated in a general direction of the axis of said shells.

4. In a dehydrator of the character described, the combination with inner, intermediate, and outer shells in spaced relation and means for the pneumatic propulsion of material therebetween, of concave heads defining passages leading from one shell to the next and supports interposed between the successive shells and being substantially free of said passages in said heads.

5. A dehydrator comprising the combination with a series of shells providing substantially concentric chambers closed except adjacent their ends, of means for introducing stringy material into one of said chambers, means for pneumatically propelling said material successively through said chambers, and supporting means for said shells connecting said shells together adjacent their respective ends in the path of said material, said supporting means providing for the communication of said chambers successively with each other and presenting smoothly rounded surfaces to the material pneumatically propelled through said chambers, said surfaces having an extent greater than the length of material propelled whereby to prevent such material from being driven against the supporting means to lodge thereon.

6. In a dehydrator, the combination with a series of shells, one within another, of intervening passages and means for the substantially continuous delivery sequentially through the shells of a pneumatic propelling and dehydrating current of gas, means for introducing into said current material to be dehydrated and propelled thereby, and head members concavely formed to provide communication with the respective passages between the shells, each of said head members having means for the spaced support of two inner shells from an outer shell.

7. In a dehydrator, the combination with a series of three mutually spaced shells, one within another, of a head member having an inner hub engaged with the inner shell, an outer ring engaged with the outer shell and concavely formed therebetween to afford communication about the end of the intermediate shell, means spanning the space between the outer and intermediate shell for supporting the intermediate shell adjacent said head member, together with a second head member comprising an inner head connected at its outer margin to the intermediate shell and extending concavely about the end of the inner shell and an outer head connected with the outer shell and extending concavely about the end of the intermediate shell in spaced relation to said inner head, means directly supporting the inner head and the inner shell from said outer head, means for causing the flow of a gaseous propelling and driving medium sequentially through the spaces within and between said shell, and means for substantially continuously introducing material to be dehydrated into said shells with said gaseous medium to be propelled and dehydrated thereby and to issue therewith from said shells.

8. In a device of the character described, the combination with inner, intermediate and outer shells in mutually spaced relation, of an annular head member provided with a ring engaging the inner shell for the support thereof and extending therefrom arcuately for approximately ninety degrees in cross section about the end of the intermediate shell and an outer head member connected with the inner head member and extending therefrom approximately ninety degrees in cross section about the end of the intermediate shell and there provided with a ring connection with the outer shell, together with means supporting the end of said intermediate shell, means for inducing pneumatic flow into the inner shell and sequentially through said shells to issue from the outer shell, and means for substantially continuously delivering material to be dehydrated into the inner shell concurrently with said pneumatic flow.

9. In a dehydrator, the combination with an inner shell, an intermediate shell and an outer shell in mutually spaced relation, of a head member connected with an end of the intermediate shell and extending concavely about the adjacent end of the inner shell and provided with means closing such end of the intermediate shell and arranged to guide material through said head member to the space between the inner and intermediate shells, gussets connected with said head member and arranged for the support of the adjacent end of the inner shell, gussets projecting from said head member outwardly, a second head member connected with said last mentioned gussets and extending concavely from the outer shell about the inner head member, means connected with said second head member to comprise a passage leading from the space directly within the outer shell, and an annulus connected with the opposite end of the outer shell and extending thence concavely about the corresponding end of the intermediate shell in spaced relation thereto, said annulus being connected with the corresponding end of the inner shell for the support thereof and being provided with means supporting the corresponding end of the intermediate shell, said head members and annulus providing communication in series between the inner shell and the spaces between successive shells, such communication being substantially free of dead air spaces, together with means for establishing a pneumatic flow of dehydrating and propelling gas into the inner shell past said first mentioned head member and through the intermediate shell into the outer shell and discharging therefrom, means for introducing the material to be dehydrated into the path of said gas in the inner shell, and means for separating the dehydrated material from said gas when dehydration is substantially complete.

10. In a dehydrator, the combination with a series of concentric shells forming intervening passages, means for feeding material to be dehydrated into one of said shells and means for simultaneously pneumatically propelling the material consecutively through said passages, of head members concavely formed to provide unobstructed end passages having no angular pockets wherein material can collect, said end passages providing communication between said intervening passages.

11. In a dehydrator, the combination with a series of shells one within another, of head members for said shells concavely formed to provide unobstructed end passages having no angular pockets wherein material can collect, said end passages providing communication from the innermost shell to the space between said innermost shell and the next successive shell, means for inducing the flow of a pneumatic dehydrating and propelling current through the innermost shell and thence through said end passages and said space, and means for substantially continuously introducing material to be dehydrated into said innermost shell in the path of said current for dehydration and propulsion therewith.

12. In a dehydrator, the combination with a series of at least three concentric shells, of a first head for said shells concavely formed to provide an unobstructed end passage leading from one end of the innermost shell to the corresponding end of the next successive shell and communicating with the space between the innermost and said next successive shell, and a second head member concavely formed to provide an unobstructed end passage from said last mentioned space about the end of said next successive shell to the space between said next successive shell and a third shell of the series, said passages having no angular pockets wherein material can collect, means for introducing a current of gas into the innermost shell for flow through said shell, passages, and spaces consecutively from the innermost shell to the outermost shell of the series, and means for feeding material to be dehydrated into the innermost shell in the path of gas flow therethrough to be dehydrated and to receive propulsion from said gas throughout said series of shells.

GERALD D. ARNOLD.